(12) United States Patent
Daoud

(10) Patent No.: US 6,353,697 B1
(45) Date of Patent: Mar. 5, 2002

(54) MODULAR LAYERED SPLICE HOLDER

(75) Inventor: Bassel Hage Daoud, Parsippany, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/364,815

(22) Filed: Jul. 30, 1999

(51) Int. Cl.⁷ .................................. G02B 6/00
(52) U.S. Cl. .................... 385/136; 385/137; 385/135
(58) Field of Search ................. 385/134, 135, 385/136, 137, 53, 99

(56) References Cited

U.S. PATENT DOCUMENTS

| | | | | |
|---|---|---|---|---|
| 5,074,635 A | * | 12/1991 | Justice et al. ................. 385/95 |
| 5,080,459 A | * | 1/1992 | Wettengel et al. ............. 385/95 |
| 5,515,472 A | * | 5/1996 | Mullaney et al. ............ 385/135 |
| 5,519,804 A | * | 5/1996 | Burek et al. .................. 385/135 |
| 5,546,495 A | * | 8/1996 | Bruckner et al. ............. 385/135 |
| 5,631,993 A | * | 5/1997 | Cloud et al. .................. 385/135 |
| 5,790,741 A | * | 8/1998 | Vincent et al. ............. 385/135 |
| 5,835,657 A | * | 11/1998 | Suarez et al. ................ 385/135 |

* cited by examiner

Primary Examiner—Hemang Sanghavi
Assistant Examiner—Omar Rojas, Jr.
(74) Attorney, Agent, or Firm—Howard C. Miskin; Gloria Tsui-Yip

(57) ABSTRACT

A layer module arrangement for splice trays. Each layer module comprises a base to support the splices and two side members extending in the same general direction from the base. The invention provides for multiple embodiments each having add-on capabilities so as to provide lodging for a high density of splice connections if desired.

8 Claims, 6 Drawing Sheets

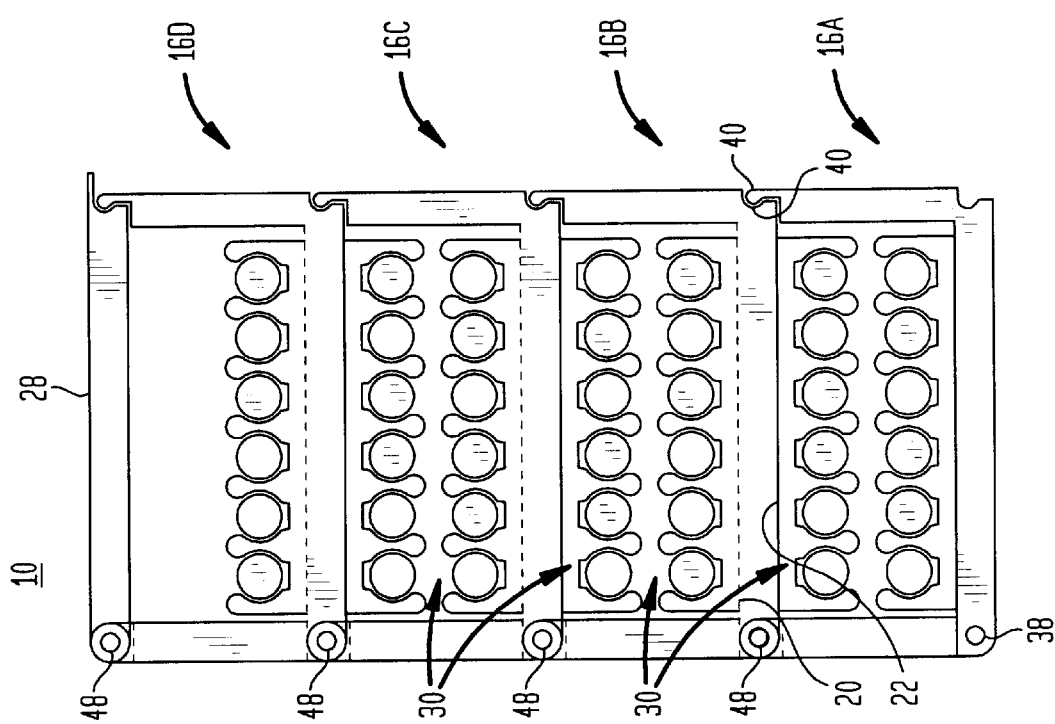
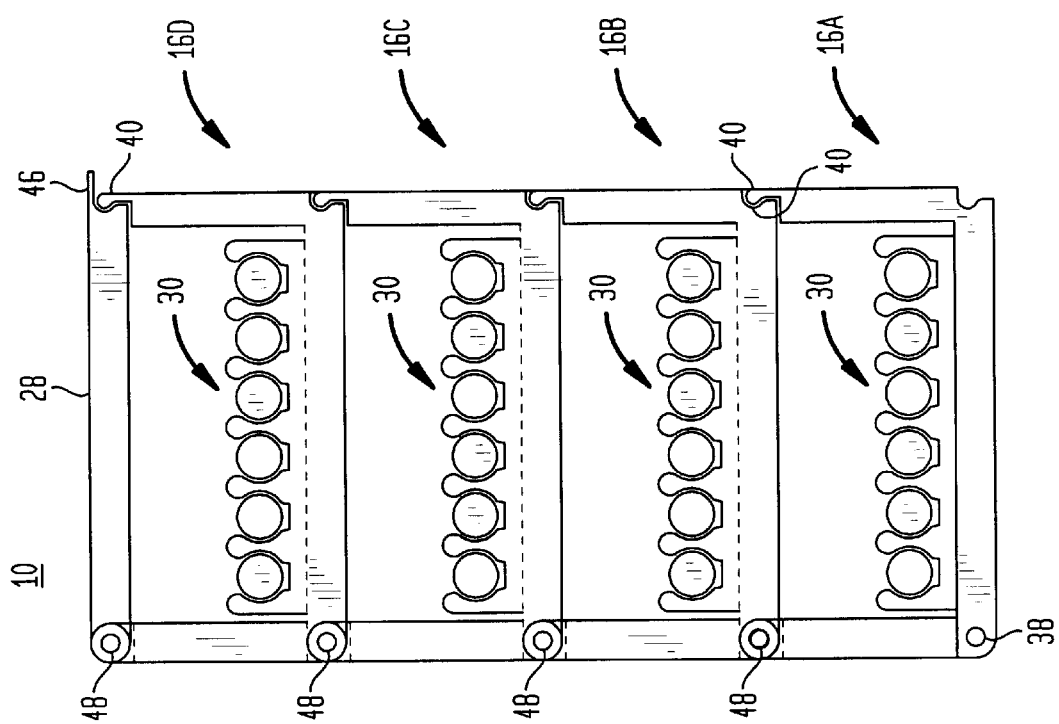

MODULAR LAYERED SPLICE HOLDER

FIELD OF THE INVENTION

The invention relates to a telecommunication apparatus and, in particular, to a modular layered splice holder.

BACKGROUND OF THE INVENTION

Telecommunications establish communications, usually between widely separated points, by electronic or fiber optic means. The initial establishment of the communication commonly involves splicing operation, whereby the lines of a subscriber are connected to a communication provider, such as a telephone provider. In buildings wherein multiple subscribers are located, the splices are formed at one location, commonly in the basement of the building, and placed into a distribution panel having a compartment therein commonly referred to as a splice holder. The splice holder may be plagued with drawbacks such as the obstruction of the view of a servicing technician examining and accomplishing the splices. Further, the difficulty of the servicing technician is magnified when a high density of splices is required. Further still, the available surface space within the location where the distribution panel, and thus the splice holder, is located may be limited, thereby preventing all of the desired splices from being placed side by side further adding to the difficulties of the servicing technician. It is desired to provide a splice holder where all the necessary splices for any particular distribution network may be conveniently mounted for accessibility to ease the burden of the servicing technician and also to allow the servicing technician to be able to see and gain access to all splices so as to facilitate the maintenance of the splices. Further, with a high density splices and limited spaces, a technician must carefully avoid disturbing splices on which work is not done.

SUMMARY OF THE INVENTION

The invention in one aspect is a splice holder for ease in servicing a multiplicity of subscribers of a telecommunication provider.

The splice holder preferably provides an enclosure having a cover and services to a multiplicity of subscribers. The splice holder comprises at least one modular layer holding at least one splice member for connection between the lines of a subscriber and those of a telecommunication provider, such as a telephone provider. The modular layer comprises a base and first and second side members preferably forming a generally elongated U shaped unit. The base has first and second oppositely disposed surfaces with at least the first surface supporting at least one spliced member. The first and second side members are located on opposite sides of the base and each extend upward and away from the first surface of the base. The first side member has a first opening at its upper end which is dimensioned to accept the insertion of a pin, and the second member has a first latch member at its upper end. With a high density of splices, the modular layers are maintained in fixed relative position with each other to prevent disturbing splices not being worked on but yet allowing accessibility to other splices. Corresponding first sides of each layer are pivotally connected to allow work on any layer but not disturbing splices on the other layers.

BRIEF DESCRIPTION OF THE DRAWINGS

FIG. 7 illustrates a four-layer arrangement of the present invention with each layer comprising a single modular layer;

FIG. 8 illustrates a four layer modular arrangement with three of the modular layers comprising a double modular layer;

It should be appreciated for the purposes of illustration, these figures are not necessarily drawn to scale.

DETAILED DESCRIPTION OF THE PREFERRED EMBODIMENTS

Figure 1:
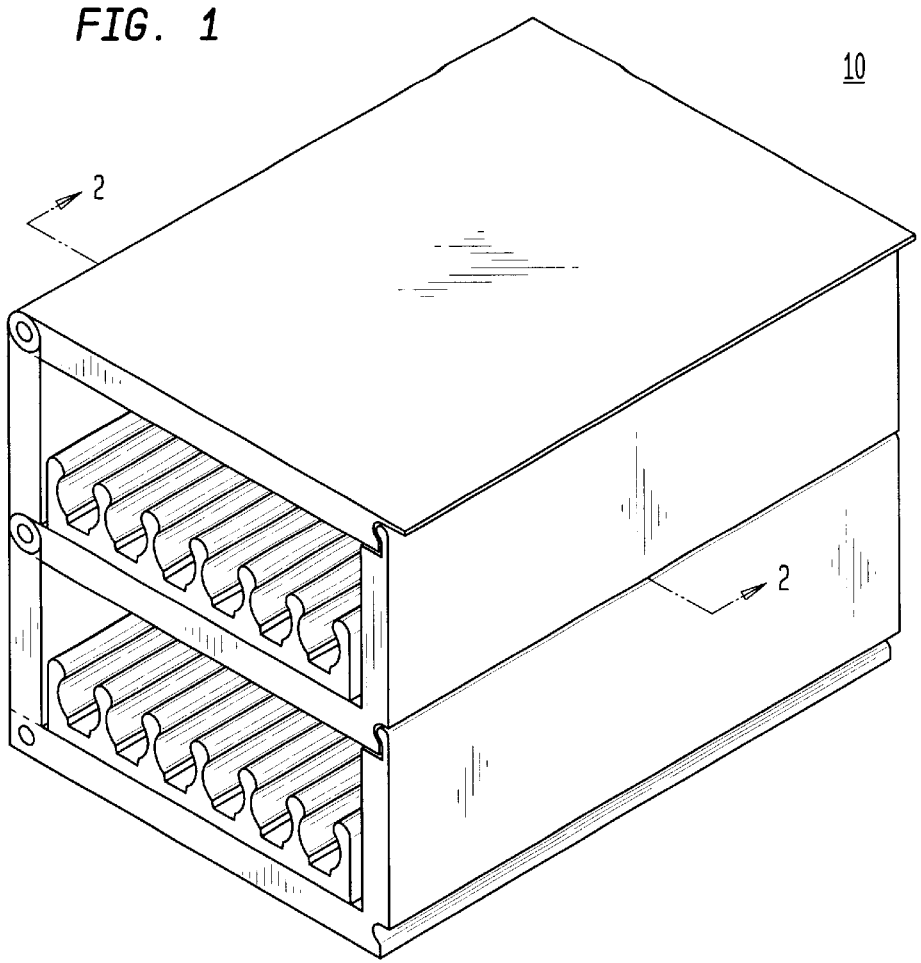
FIG. 1 is a perspective view of a two modular layer splice holder of the present invention.

FIG. 1 illustrates a two layer modular splice holder 10 that serves as both an enclosure and a holder of the present invention. As shown in FIG. 1, splice holder 10 provides housing for a high-density arrangement of splice holders in a defined surface area. The splice holder 10 has a layered arrangement which may be further described with reference to FIG. 2 which is a view taken along line 2—2 of FIG. 1. The splice holder 10 may be mounted within a distribution panel along with other electrical components such as telephone cables and wires.

Figure 2:
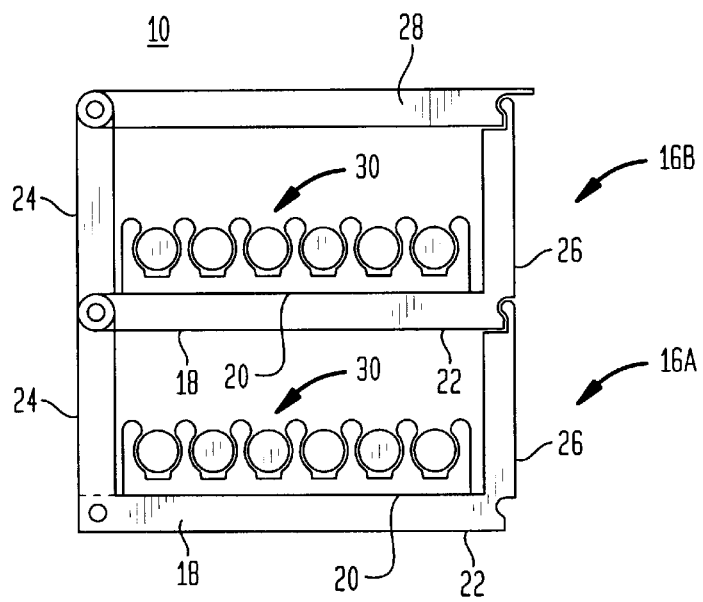
FIG. 2 is a view of the splice holder taken along line 2—2 of FIG. 1.

FIG. 2 illustrates the two layer modular arrangement 16A and 16B, wherein each modular layer 16A and 16B, generally referred to as modular layer 16, comprises a support member 18, serving as a base and having first and second oppositely disposed surfaces 20 and 22. Each modular layer 16A and 16B further comprises first and second side members 24 and 26 located on opposite sides of the base 18 and each extending upward, as viewed in FIG. 2, from the first surface 20 of the base 18. The top-most modular layer 16B further comprises a top member 28 for covering the splices. Each of the modular layers 16A and 16B holds at least one splice member that is used to connect lines of subscriber to those of a telecommunication provider, with the spliced members being located on a tray 30 which may be further described with reference to FIG. 3.

Figure 3:
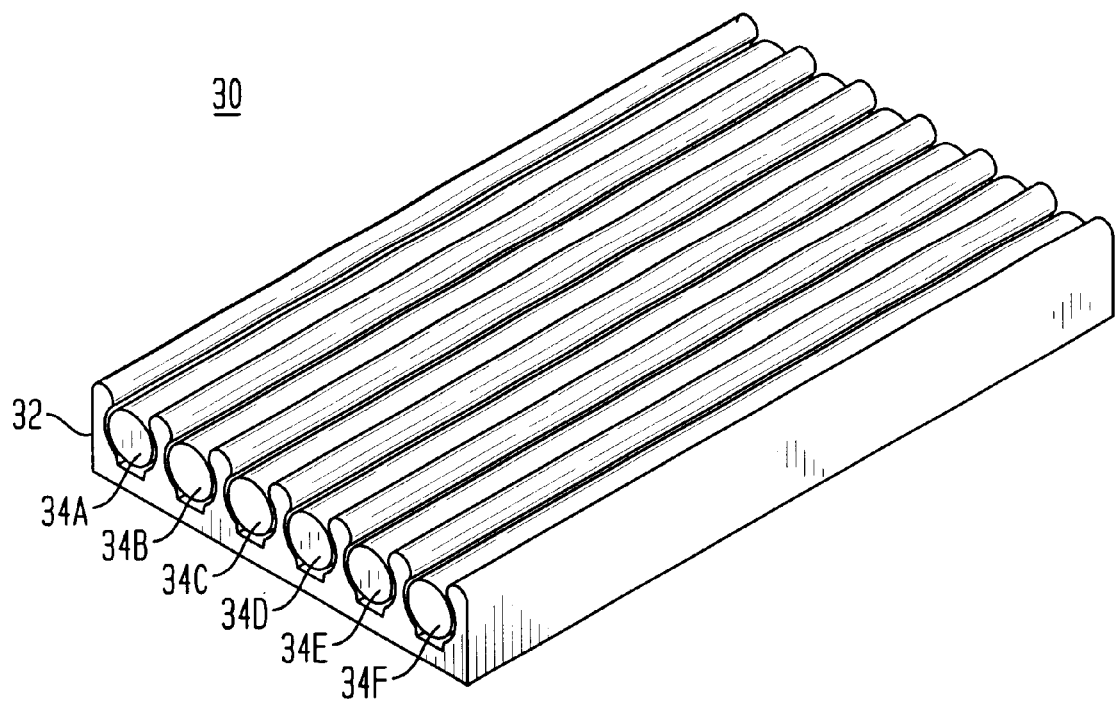
FIG. 3 is a perspective view of a typical splice holder tray.

FIG. 3 illustrates the splice tray 30 as having a holding member 32 that preferably captures a plurality of splice members shown in FIG. 3 as 34A, 34B, 34C, 34D, 34E, and 34F. Typically the splice members are captured in respective resilient holding pockets. Although one type of splice tray is shown in FIG. 3, other types of splice tray for holding the spliced members 34A . . . 34F may be utilized in the practice of the present invention. Furthermore, different types of splice trays 30 can be used in different modular layer 16, depending on the specific need and usage of the splice holder 10. Although it is preferred to utilize a tray, if desired, the spliced members may rest directly on the base 18 of the associated modular layer 16 by incorporating the tray configuration onto one or both surfaces 20 and 22 of base 18 itself. The splice tray 30 is preferably attached by a double-sided adhesive to one of the oppositely disposed surfaces 20 and 22 of the base 18 of the modular layer 16 which may be further described with reference to FIGS. 4, 5 and 6. Other methods of attaching splice tray 30 to one or both surfaces 20 and 22, such as gluing, may be used.

Figure 4:
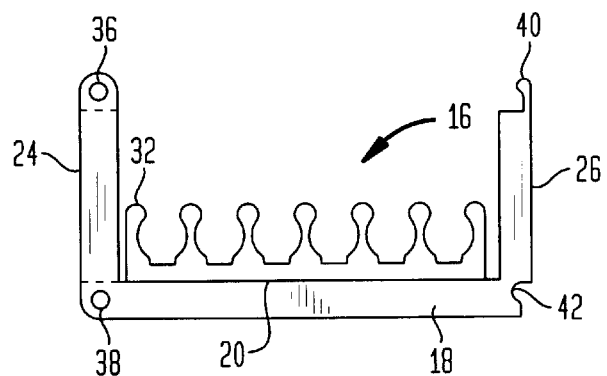
FIG. 4 illustrates a single modular layer.

FIG. 4 illustrates a single modular layer 16, wherein the tray 30 is adhered to the first surface 20 of the base 18 by means of an adhesive known in the art. The single modular layer 16 of FIG. 4, in addition to the elements already briefly described with reference to FIG. 2, further comprises an opening 36 in the upper end of the side member 24 which is dimensioned to accept a pivot pin (not shown). The lower end of the side member 24 has an opening 38, which is located on one side of the base 18. The upwardly extending side member 26 has its upper portion with a first latch member 40 located thereon. The lower portion of side member 26 has a second latch member 42, located on the side of base 18 opposite opening 38. The first latch member 40 and the second latch member 42 have complementary dimensions so that the first latch member 40 fits into the second latch member 42 as shown in FIGS. 7–10 to be further described. The modular layer 16 may also comprise a double modular layer which may be further described with reference to FIG. 5.

Figure 5:
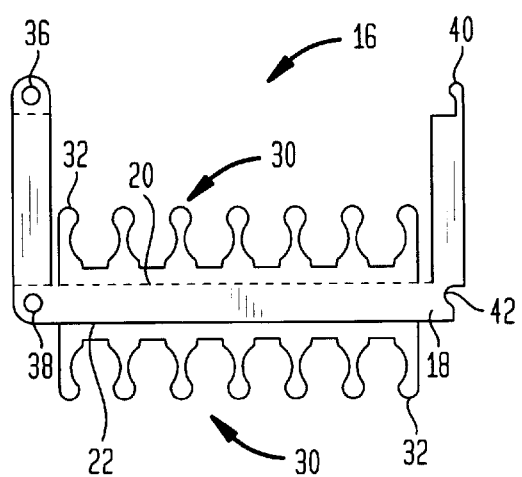
FIG. 5 illustrates a double modular layer.
Figure 6:
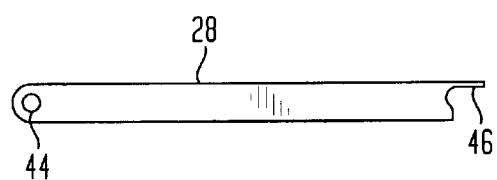
FIG. 6 illustrates a latchable top member of the modular layer of the present invention.

FIG. 5 illustrates a double modular layer 16 as having the two trays 30, with one tray 30 attached to the first surface 20 of the base 18 and with the other tray 30 attached to the second surface 22 of the base 18. The arrangement of FIG. 5, as well as the arrangement of FIG. 4, operatively cooperates with latchable top member 28, which may be further described with reference to FIG. 6.

The latchable top member 28 has first and second ends that span between the first and second upwardly extended side members 24 and 26. The first end of top member 28 has a first opening 44 that is dimensioned to accept a pin which is the same pin that is acceptable by the opening 36 of the first side member 24. The insertion of such a pin is to be further described with reference to FIGS. 7–10. The second end of the top member 28 has a third latch member 46 which is dimensioned to releasably engage and latch with the first latch member 40 of the second upwardly extended side member 26 in a manner as to be further described with reference to FIGS. 7–10.

The splice holder 10 has a multiplicity of modular layer arrangements, one of which may be further described with reference to FIG. 7 that illustrates a four modular layer arrangement 16A, 16B, 16C, and 16D, with each modular layer s comprising a single layer module 16 previously discussed with reference to FIG. 4. From FIG. 7, it should be noted that the first and second modular layers 16A and 16B are interconnected by the first latch member 40 mating with the second latch member 42 operating similar to a tongue and groove arrangement. The first latch member 40 and the second latch member 42 are dimensioned in a complementary manner so as to preferably provide for a snap-type releasably engaging arrangement. Further, from FIG. 7, it should be noted that the interconnection between layers 16A, 16B, 16C, and 16D, is established by the insertion of a pin 48 (as shown in FIG. 7) as well as the pin 48 being inserted to establish for the pivoting of top member 28, whereby the third latch member 46 releasably engages with the first latch member 42, as shown in FIG. 7. A further embodiment of the splice holder may be described with reference to FIG. 8.

FIG. 8 is quite similar to FIG. 7, but intermediate modular layer 16B and 16C as well as the upper modular layer 16D are comprised of the two modular layer arrangement that was discussed with reference to FIG. 5. The embodiment of FIG. 8, as well as the embodiment of FIG. 7, has pivotal capabilities, wherein the pivotal capability of that of the embodiment FIG. 8 may be further described with reference to FIG. 9.

Figure 9:
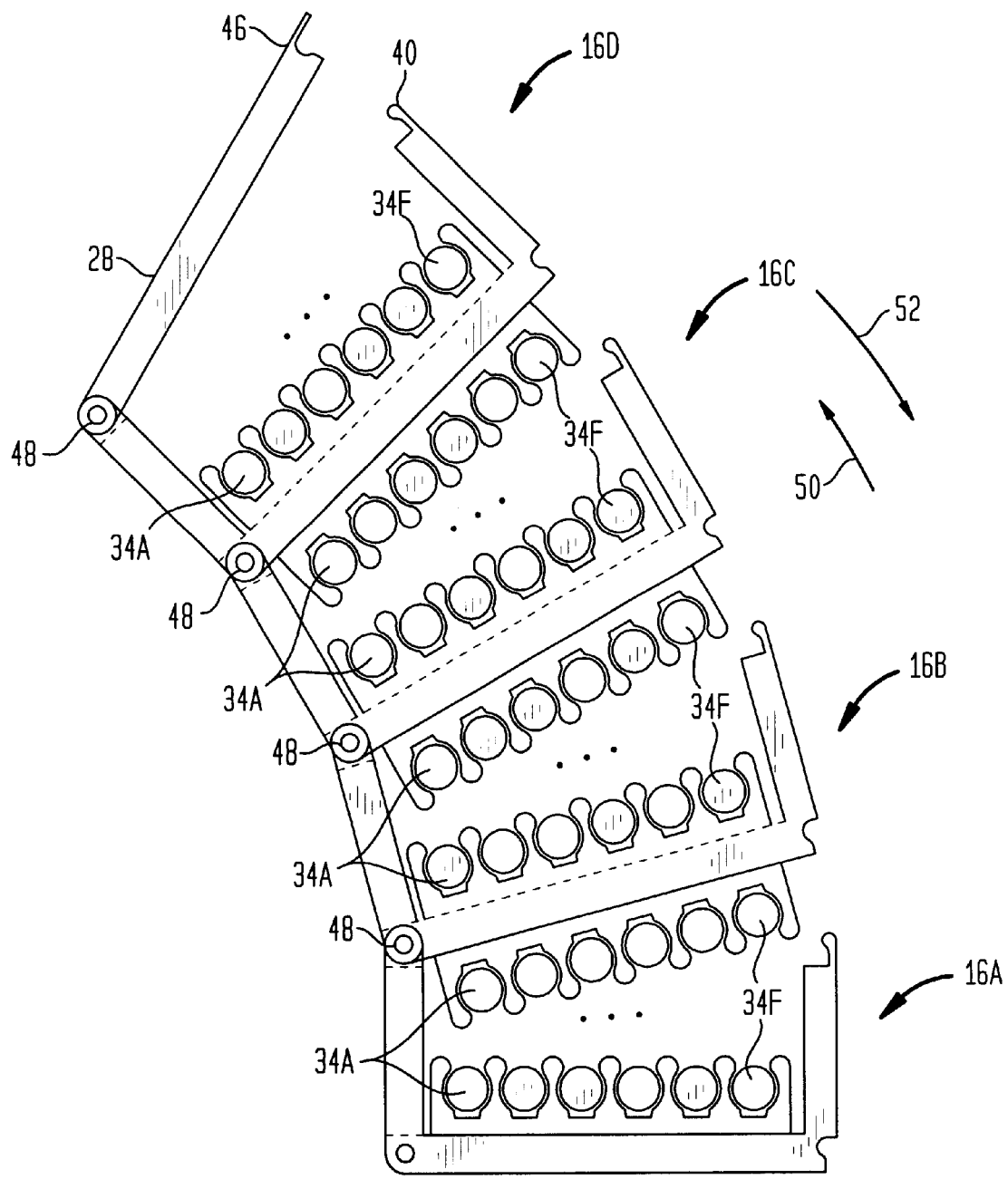
FIG. 9 illustrates the pivoting action to allow all splice members being housed by the splice holder to be visually inspected by a technician.

FIG. 9 illustrates the pivoting action of the three modular layers 16B, 16C, and 16D about pivot points established by pins 48. The pivoting occurs when the modular layers 16B, 16C, and 16D are moved upward in the direction indicated by directional arrow 50. From FIG. 9 it can be realized that the continued movement in direction 50 of the modular layers 16B, 16C and 16D, will allow the maintenance personnel of the splice holder 10 to visually see each of the splice members 34 so as to provide for the necessary maintenance thereof as needed. Further, from FIG. 9 it can be realized that the open arrangement shown in FIG. 9 may be closed by returning the modular layers 16B, 16C and 16D to their home positions by rotating the modular layers downward in a direction indicated by directional arrow 52. A further pivoting arrangement for the embodiment of FIG. 8 may be further described with reference to FIG. 10.

Figure 10:
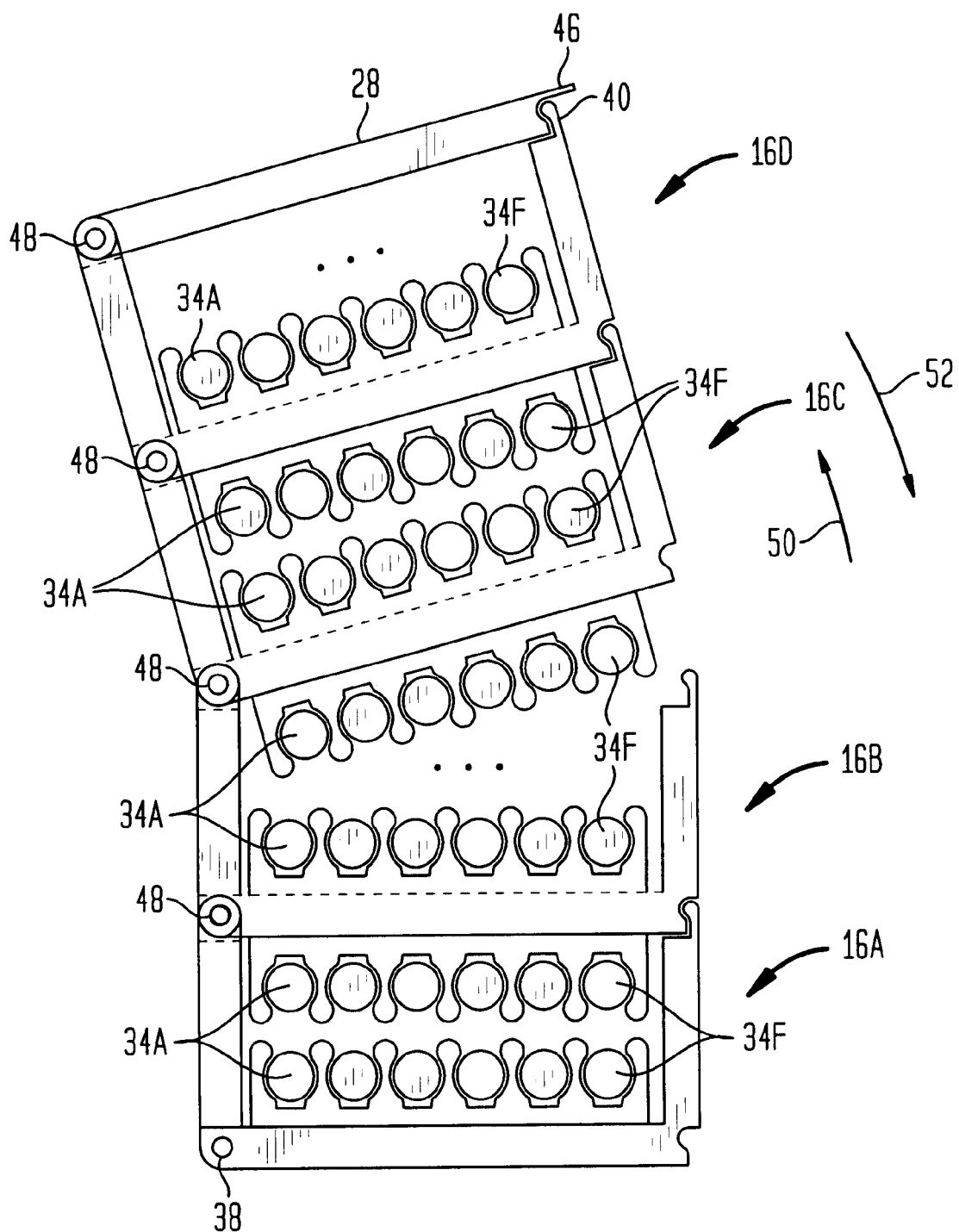
FIG. 10 is similar to FIG. 9, but with only one layer pivoted so as to allow access to a selected desired modular layer by a technician.

FIG. 10 illustrates that the upper two modular layers 16C and 16D may be operated in unison so as to allow for an operator to select desired viewing of the lower level of layer module 16B. This desired view may be accomplished by moving the upper two modular layers 16C and 16D in a direction indicated by directional arrow 50 and, when it is desired to return the modular layers 16C and 16D to their home position, the modular layers 16C and 16D may be moved in a direction indicated by directional arrow 52.

It should now be appreciated that the practice of the present invention provides for a layer module splice holder 10 that allows for a multiplicity of trays to be sequentially arranged so as to accommodate a high density of splices being at any one location. While pivoting of various adjacent layers were shown by a common pin, other pivoting means may be used. The pivoting construction shown on one side prevents mishandling or displacing layers not being examined even in a small cramped space, such as illustrated in FIG. 10.

Various additional modifications will become apparent to those skilled in the art, all such variations which basically rely on the teaching to which this invention has advanced the art are properly considered within the scope of this invention

What I claim is:

1. A splice holder comprising at least one modular layer holding at least one spliced member, said modular layer comprising:
   (a) a base having first and second oppositely disposed surfaces for supporting at least first and second spliced members, with said first surface supporting said first spliced member and with said second surface supporting said second spliced member; and
   (b) first and second side members located on first and second sides of said base and each extending substantially perpendicular in the same direction from said first surface of said base terminating in a free end, a first pivoting element adjacent said free end of said first side member, a first latch member adjacent said free end of said second side member, a corresponding second pivoting element on said second surface adjacent said first side of said base and a corresponding second latch member on said second surface adjacent said second side of said base.

2. The splice holder according to claim 1, wherein said modular layer further comprises a top member with first and second ends and spanning between said free ends of said first and second side members, said first end of said top member pivotally attached to said pivoting element of said first side member, said second end of said top member having a corresponding third latch member dimensioned to releasably engage and latch with said first latch member of said second side member.

3. The splice holder according to claim 1, further comprising a first tray attached to said first surface of said base, wherein said first spliced member is mounted on said first tray.

4. The splice holder according to claim 3 comprising a plurality of stacked modular layers with an upper modular layer and a lower modular layer, said lower modular layer having its second surface defining a floor of said holder and said upper modular layer having its first pivoting element of its first side member pivotally connected to said top member.

5. The splice holder according to claim 4, wherein said plurality of modular layers further having at least one intermediate modular layer, wherein said first latch member of said intermediate modular layer mates with said second latch member of an upper adjacent modular layer.

6. The splice holder according to claim 2 comprising a plurality of stacked modular layers with an upper modular layer, a lower modular layer and at least one intermediate modular layers, said lower modular layer having its second surface defining a floor of said splice holder and said upper modular layer having its first side member pivotally connected to said top member and each of said intermediate modular layer being pivotally connected to adjoining modular layers on said corresponding first and second pivoting elements of said first side members.

7. The splice holder according to claim 1, further comprising a first tray attached to said first surface of said base and a second tray attached to said second surface of said base, wherein said first spliced member is mounted on said first tray and said second spliced member is mounted on said second tray.

8. The splice holder according to claim 2 comprising an upper modular layer, a lower modular layer and at least one intermediate modular layers, said lower modular layer having its second surface defining a floor of said splice holder and said upper modular layer having its first side member pivotally connected to said top member and each of said intermediate modular layer being pivotally connected to adjoining modular layers on said corresponding first and second pivoting elements of said first side members.

\* \* \* \* \*